United States Patent
Bursch

(10) Patent No.: US 11,731,549 B2
(45) Date of Patent: Aug. 22, 2023

(54) VEHICLE COOLER WITH PASSENGER CABIN ACCESS

(71) Applicant: Toyota Motor Engineering & Manufacturing North America, Inc., Plano, TX (US)

(72) Inventor: Eric F. Bursch, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 409 days.

(21) Appl. No.: 16/793,448

(22) Filed: Feb. 18, 2020

(65) Prior Publication Data

US 2021/0253012 A1 Aug. 19, 2021

(51) Int. Cl.
*B60N 3/10* (2006.01)
*B60P 7/08* (2006.01)
*B62D 33/04* (2006.01)
*B60P 3/20* (2006.01)

(52) U.S. Cl.
CPC .............. *B60N 3/104* (2013.01); *B60P 3/205* (2013.01); *B60P 7/08* (2013.01); *B62D 33/048* (2013.01)

(58) Field of Classification Search
CPC ....... B60N 3/104; B62D 33/048; B60P 3/205; B60P 7/08
USPC ........................................................ 224/404
See application file for complete search history.

(56) References Cited

U.S. PATENT DOCUMENTS

| | | | | |
|---|---|---|---|---|
| 1,672,350 A | * | 6/1928 | Chapman | B60N 3/103 190/12 R |
| 2,437,885 A | * | 3/1948 | Frankw | B60N 3/104 62/239 |
| 2,525,952 A | * | 10/1950 | Saterlie | B60N 3/10 312/351 |
| 4,543,798 A | | 10/1985 | Page | |

(Continued)

FOREIGN PATENT DOCUMENTS

| | | | | |
|---|---|---|---|---|
| CN | 109733287 A | * | 5/2019 | ............... B60N 2/01 |
| CN | 112902533 A | * | 6/2021 | ............. B60N 3/104 |

(Continued)

OTHER PUBLICATIONS

Machine Translation of EP 467 (Year: 1985).*

*Primary Examiner* — Hilary L Gutman
(74) *Attorney, Agent, or Firm* — Christopher G. Darrow; Darrow Mustafa PC

(57) ABSTRACT

A vehicle assembly is provided that affords multiple access points to a cold-storage container. The vehicle assembly includes a vehicle having a passenger cabin and a cargo area adjacent the passenger cabin. A cold-storage container is disposed in the cargo area and includes a first opening providing access from the cargo area to an interior of the cold-storage container, and a second opening providing access from the passenger cabin into the interior. In various aspects, the vehicle may be a pickup truck, where the cold-storage container is located in a cargo bed. A header portion of the cargo bed can include an access door configured to selectively provide a passageway between the cargo bed and the interior of the passenger cabin. The passenger cabin may include an access panel that selectively provides entry to the passageway and into the cold-storage container.

18 Claims, 8 Drawing Sheets

(56) References Cited

U.S. PATENT DOCUMENTS

| | | | | |
|---|---|---|---|---|
| 4,765,151 A * | 8/1988 | Bessey | | F25D 3/06 62/239 |
| 4,848,832 A * | 7/1989 | Starnes | | B60P 3/32 296/190.11 |
| 5,439,150 A * | 8/1995 | Trahms | | B60R 9/00 224/543 |
| 5,524,951 A * | 6/1996 | Johnson | | B60R 9/00 296/183.1 |
| 5,848,744 A * | 12/1998 | Dischner | | B60R 11/06 224/527 |
| 5,934,727 A * | 8/1999 | Store | | B62D 33/0273 296/26.11 |
| 6,321,926 B1 * | 11/2001 | Allen | | B60N 3/10 220/23.86 |
| 6,447,039 B1 * | 9/2002 | Song | | B60P 3/40 296/100.07 |
| 6,447,051 B1 * | 9/2002 | Lukomskiy | | B60P 3/40 296/183.1 |
| 6,502,885 B1 | 1/2003 | Gammon et al. | | |
| 6,513,863 B1 * | 2/2003 | Renke | | B60P 3/423 296/57.1 |
| 6,641,193 B2 * | 11/2003 | Alkevicius | | B60R 15/00 296/37.6 |
| 6,763,959 B2 * | 7/2004 | Tedder | | F25D 3/08 220/759 |
| 6,786,535 B1 * | 9/2004 | Grzegorzewski | | B60N 2/3013 296/37.16 |
| 6,796,600 B1 * | 9/2004 | Ferer | | B60P 3/423 296/37.6 |
| 6,814,383 B2 | 11/2004 | Reed, III et al. | | |
| 6,893,080 B2 * | 5/2005 | Hashimoto | | E05B 85/243 292/217 |
| 7,097,224 B2 * | 8/2006 | Lester | | B60R 9/00 224/404 |
| 7,128,356 B2 | 10/2006 | Bassett | | |
| 7,246,847 B2 * | 7/2007 | Polewarczyk | | B60J 5/00 296/190.11 |
| 7,313,928 B2 * | 1/2008 | Girard | | F25D 3/08 62/457.7 |
| 7,703,824 B2 | 4/2010 | Kittleson et al. | | |
| 8,038,195 B1 * | 10/2011 | Hutcheson | | B60R 9/00 296/136.04 |
| 8,317,252 B2 * | 11/2012 | Kimmet | | B60J 7/1607 296/76 |
| 9,475,371 B2 | 10/2016 | LaBiche | | |
| 11,192,487 B2 * | 12/2021 | Wu | | F25D 11/003 |
| 2002/0023452 A1 * | 2/2002 | Duerr | | B60N 3/104 62/244 |
| 2002/0070573 A1 * | 6/2002 | Song | | B60P 3/40 296/26.11 |
| 2005/0110294 A1 * | 5/2005 | Grafton | | B60R 9/00 296/37.1 |
| 2018/0037150 A1 * | 2/2018 | Rotharmel | | B60H 1/241 |
| 2021/0114530 A1 * | 4/2021 | Joshi | | B60R 9/065 |
| 2022/0266915 A1 * | 8/2022 | Salter | | B60P 3/341 |

FOREIGN PATENT DOCUMENTS

| | | | | |
|---|---|---|---|---|
| DE | 3544491 C | * | 6/1987 | ........... B60N 2/4613 |
| EP | 0133467 A2 | * | 2/1985 | |
| KR | 20070028710 A | * | 3/2007 | ............. B60N 3/104 |
| KR | 2014084759 A | * | 7/2014 | ......... B60H 1/00271 |

* cited by examiner

VEHICLE COOLER WITH PASSENGER CABIN ACCESS

TECHNICAL FIELD

The present disclosure generally relates to a cold-storage container with multiple access points, and more particularly, to a cooler that is accessible from both a storage area of a vehicle, such as a truck cargo bed or trunk cargo area, as well as from an interior of a passenger cabin portion of the vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicle interior space is an important design consideration. Generally, while larger interior areas may provide increased comfort and amenities, smaller interior areas may lead to smaller vehicle size, potentially with increased fuel efficiency. For pickup truck vehicles, a rear truck bed area is often used for cargo, including coolers, in order to accommodate more passengers in the interior passenger cabin space. Thus, if a user wants to retrieve anything from the rear truck bed area, such as an item from a cooler, the user must either wait until the arrival at a final destination, or the vehicle needs to stop at an interim location such that a user can exit the cabin and then access the cooler. Although certain vehicles have provided center console units with thermoelectric cooling technology integrated therein, such units are small, and eliminate storage space that could be used for other content.

Accordingly, there remains a need to provide increased space in a passenger cabin, while allowing access to a cold-storage container from within the passenger cabin.

SUMMARY

This section provides a general summary of the disclosure, and is not a comprehensive disclosure of its full scope or all of its features.

In various aspects, the present teachings provide a vehicle assembly that affords multiple access points to a cold-storage container. The vehicle assembly includes a vehicle having a passenger cabin and a cargo area located adjacent the passenger cabin. A cold-storage container is disposed in the cargo area. The cold-storage container includes a first opening configured to provide access from the cargo area to an interior of the cold-storage container, and a second opening configured to provide access from the passenger cabin to the interior of the cold-storage container. In various aspects, the interior of the cold-storage container defines a first chamber accessible using the first opening and configured to store a cooling material, a second chamber accessible using the second opening and configured to store items for cooling. The cold-storage container may be used with cooling materials, such as ice, or may include a powered refrigeration unit.

In other aspects, the present teachings provide cold-storage container assembly for a pickup truck that provides multiple access points. The assembly includes a passenger cabin and a cargo bed adjacent the passenger cabin. The cargo bed includes a header portion, a floor portion, and two opposing side-wall portions cooperating to defining a cargo space. A passageway is provided between the cargo bed and an interior of the passenger cabin. A cold-storage container is disposed in the cargo bed. The cold-storage container includes a first opening configured to provide access to an interior of the cold-storage container from a location in the cargo bed, and a second opening configured to provide access to the interior of the cold-storage container from a location in the passenger cabin. In various aspects, the header portion of the cargo bed may have an access door configured to selectively provide the passageway between the cargo bed and the interior of the passenger cabin. The passenger cabin may include one of a sliding access panel and a folding access panel that selectively provides entry to the passageway and into the cold-storage container.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
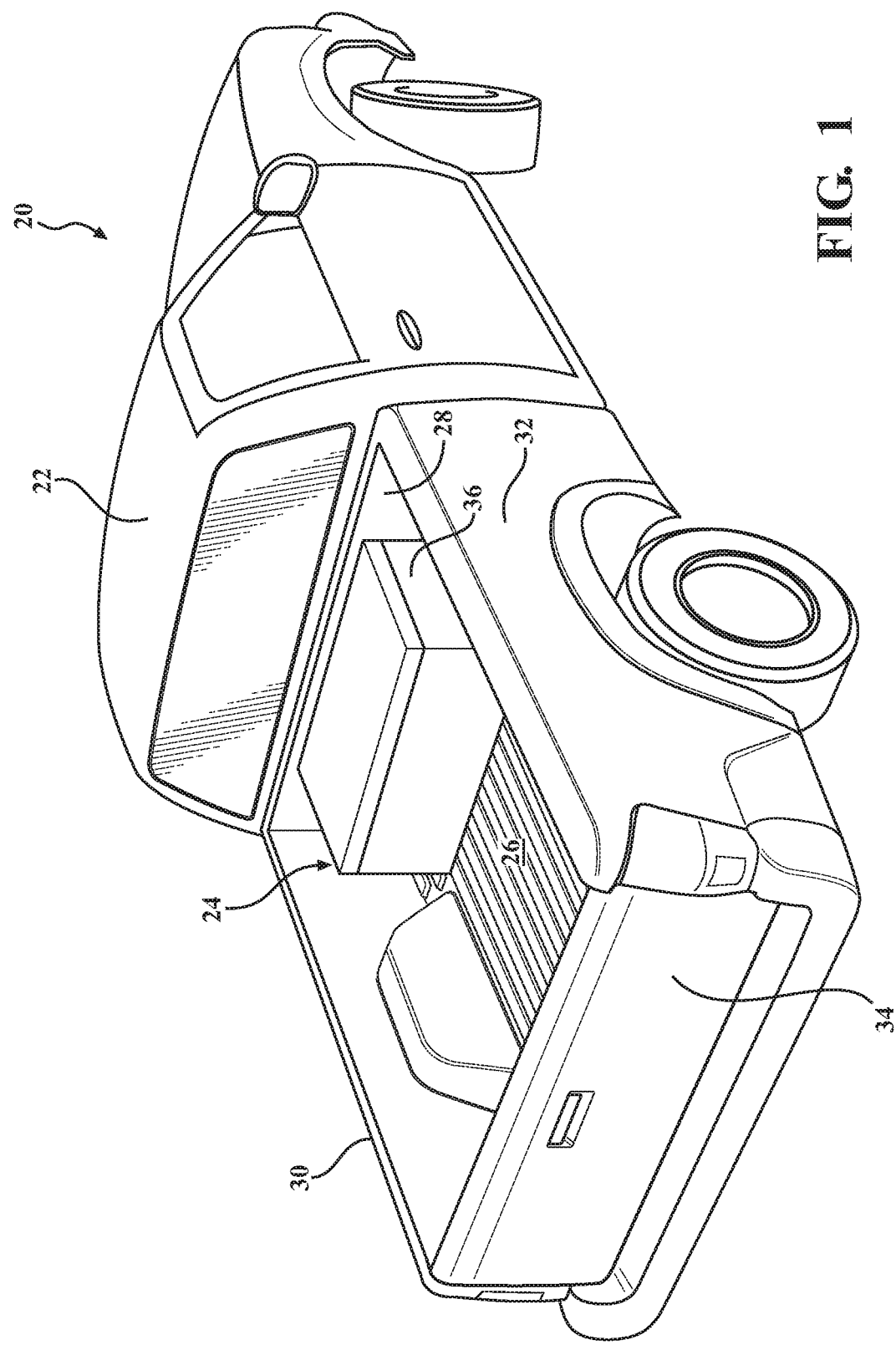
FIG. 1 is a rear perspective view of an exemplary pickup truck vehicle including a cold-storage container located adjacent a header portion of a cargo bed according to various aspects of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a vehicle assembly that affords multiple access points to a cold-storage container, such as a cooler. Although any type of vehicle can generally be used with this technology, this description section may focus on discussions regarding the use with standard passenger vehicles and pickup truck vehicles. With a passenger vehicle, for example, the vehicle assembly may include a passenger cabin and a cargo area, such as a trunk, located adjacent the passenger cabin. With a pickup truck vehicle, for example, the vehicle assembly may include a passenger cabin and a cargo bed located adjacent the passenger cabin. A cold-storage container is disposed in the cargo area or cargo bed. The cold-storage container may include a first opening with a traditional hinged lid, or the like, configured to provide access from the cargo area or cargo bed to an interior of the cold-storage container, and a second opening on a rear facing wall that is configured to provide access from the passenger cabin to the interior of the cold-storage container. Thus, the present technology allows more storage space in the passenger cabin, while still providing access through the passenger cabin. In various aspects, the interior of the cold-storage container defines a first chamber accessible using the first opening and configured to store a cooling material, and a second chamber accessible using the second opening and configured to store items for cooling. The different chambers may be completely separate from one another, or may include passageways for moving or placing items in or between different chambers. The cold-storage container may be used with cooling materials, such as ice, or may include a powered refrigeration unit. The cold-storage container can be customized for the specific vehicle, and can be provided with various molded features, such as shelves, and formed areas and recesses configured for holding cans, bottles, and the like in place during vehicular travel.

As used herein, the term "vehicle" should be construed having a broad meaning, and should include all types of vehicles, with non-limiting examples including a standard or traditional passenger car (e.g., two door or four door), truck, motorcycle, off-road vehicle, bus, boat, airplane, helicopter, lawn mower, recreational vehicle, amusement park vehicle, farm vehicle, construction vehicle, tram, golf cart, train, or trolley, etc. The vehicles may be self-driving, for example, having an autonomous mode, and/or be manually operated.

FIG. 1 is a rear perspective view of an exemplary pickup truck vehicle 20 including a passenger cabin 22 and a rear cargo bed 24. The passenger cabin 22 can be any style and shape with a seating area. In various aspects, the passenger cabin 22 can be a standard/regular cab, generally with two doors and a single row of seating; an extended cab, generally including a storage area with at least one row of passenger seating; or a crew cab, generally with four doors and two rows of seating. Other designs and passenger cabin layouts would also work with the present technology. The cargo bed 24 may be defined by a floor portion 26, a header portion 28 generally located adjacent the passenger cabin 22, opposing side walls 30, 32, and a movable tailgate 34. As shown, a cold-storage container 36 is located adjacent the header portion 28 of the cargo bed 24.

Figure 2:
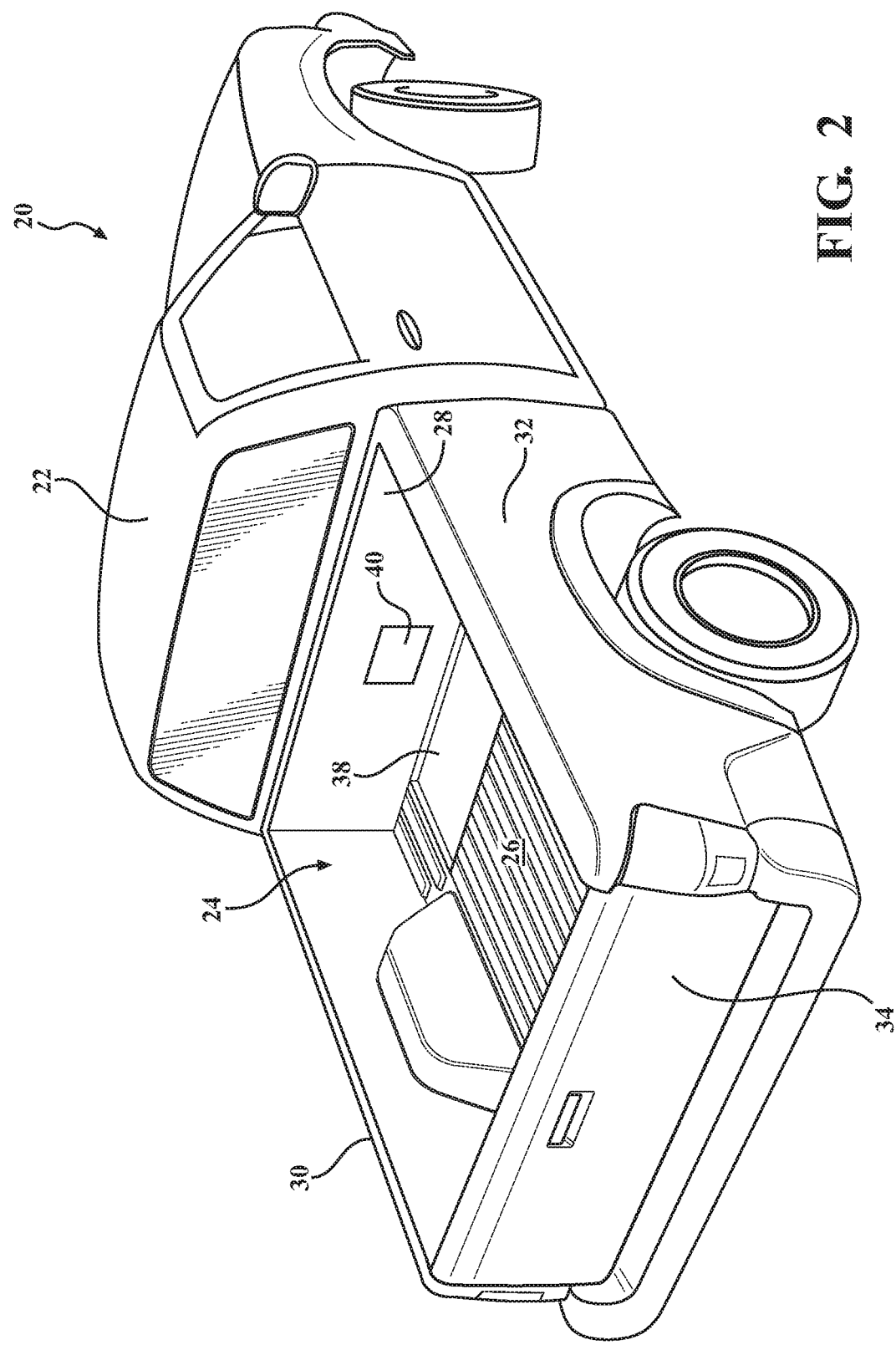
FIG. 2 is a rear perspective view of the pickup truck vehicle of FIG. 1, without the cold-storage container and illustrating the header portion of the cargo bed including an access door configured to selectively provide a passageway between the cargo bed and an interior of the passenger cabin.

FIG. 2 is a rear perspective view of the pickup truck vehicle of FIG. 1, shown without the cold-storage container 36. As shown, the floor portion 26 may be provided with an optional recess area 38 that may be shaped or otherwise configured to retain the cold-storage container 36 at a fixed location within the cargo bed 24. In certain aspects, the cold-storage container 36 may be removably coupled or fastened to one or both of the floor portion 26 and the header portion 28 using suitable mechanical fastening techniques. FIG. 2 illustrates the header portion 28 of the cargo bed 24 including an access door 40. In various aspects, the access door 40 may be removable from the header portion 28, or it may be configured to pivot, slide, fold, or otherwise convert between open and closed positions, ultimately configured to selectively provide a passageway 46 (shown in FIG. 3B) between the cargo bed 24 and an interior of the passenger cabin 22. Locking mechanisms (not shown) may be provided to prevent unauthorized use of the access door 40.

Figure 3A:
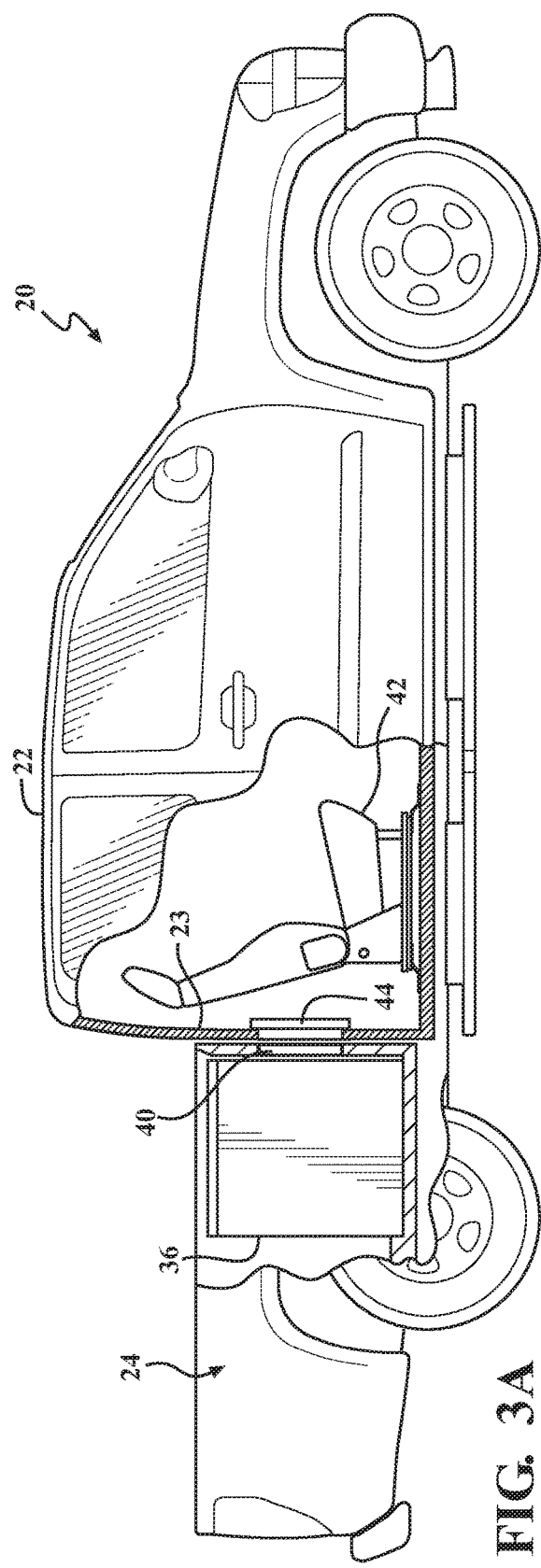
FIGS. 3A-3B are simplified schematic side plan views of a portion of a truck cargo bed and passenger cabin with an exemplary cold-storage container according to various aspects.
Figure 3B:
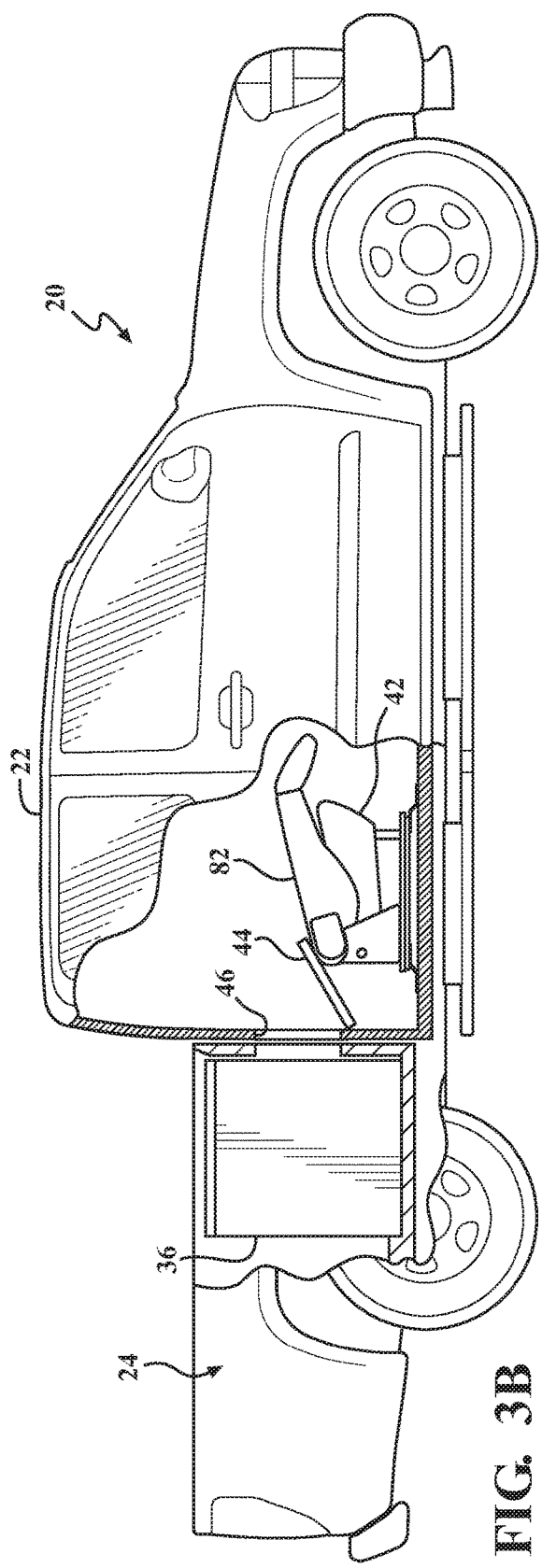

FIGS. 3A-3B are simplified schematic side plan views illustrating a portion of a truck cargo bed 24 and passenger cabin 22, with an exemplary cold-storage container 36 in the cargo bed 24, adjacent to the rear portion of the passenger cabin 22. FIG. 3A illustrates a folding passenger seat 42 in an upright position and located in a rear seating area of the passenger cabin 22. An access panel 44 may be provided at a rear wall 23 of the passenger cabin, for example, behind the passenger seat 42. Similar to the access door 40 of the header portion 28, the access panel 44 may be removable from the rear wall 23 of the passenger cabin 22, or it may be configured to pivot, slide, fold, or otherwise move between open and closed positions, ultimately configured to coordinate with the access door 40 and to provide the passageway 46 (FIG. 3B) between the cargo bed 24 and an interior of the passenger cabin 22. A locking mechanism (FIG. 9) may be provided to prevent unauthorized use of the access panel 44. FIG. 3B schematically illustrates the passageway 46, with the access door 40 of the header portion 28 either removed or in an open position, and a folding access panel 44 that is in an open position and is resting on a surface of the folding passenger seat 42 in a forward folding position.

Figure 4:
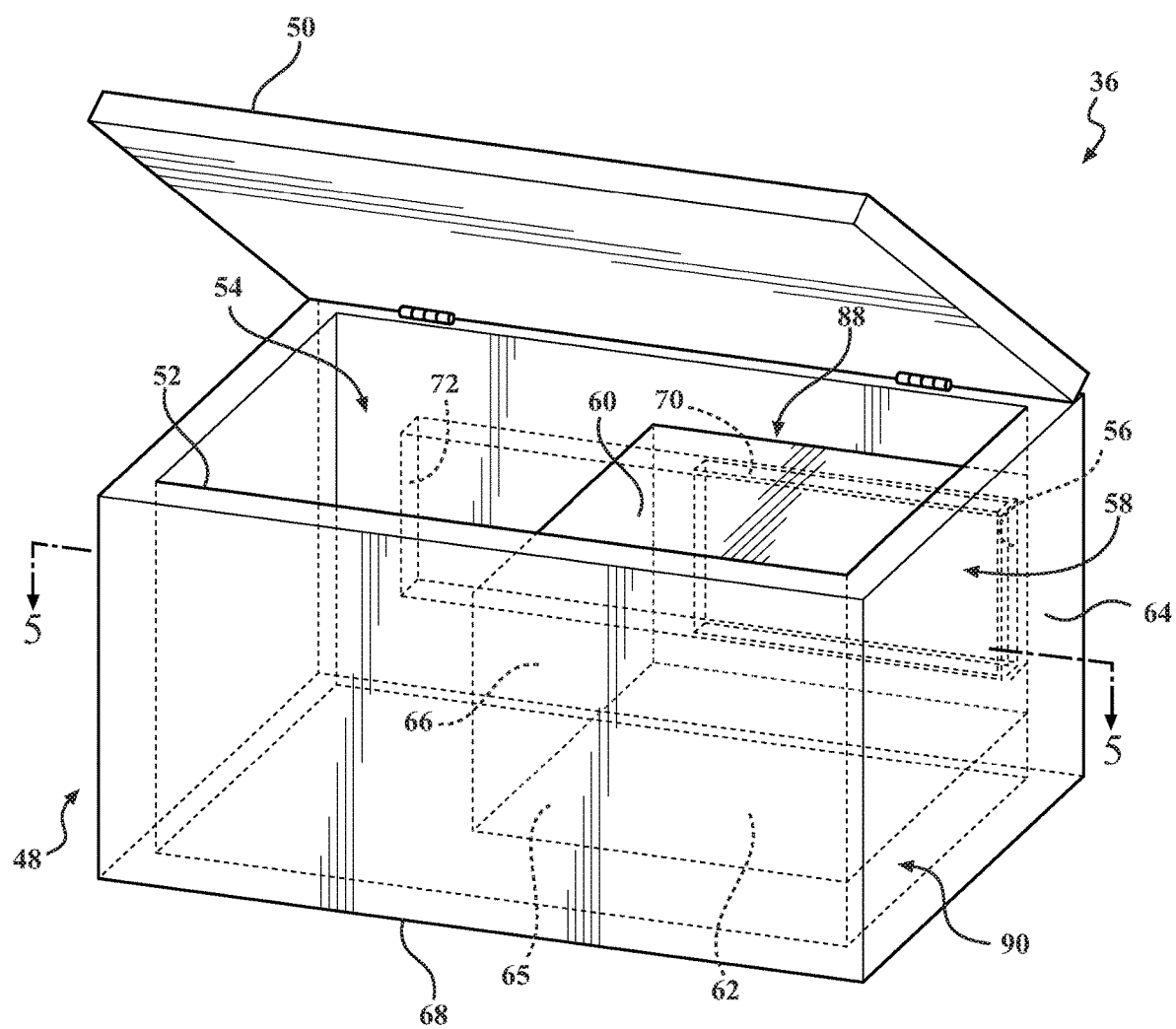
FIG. 4 is a perspective view of an exemplary cold-storage container according to one aspect of the present technology.

FIG. 4 is a perspective view of an exemplary cold-storage container 36 according to one aspect of the present technology. The cold-storage container 36 can generally have any shape or configuration so as to provide at least one exterior wall that can be placed in close contact with a substantially planar wall of the header portion 28 of the cargo bed 24. As shown, the cold-storage container 36 may be provided with a main body portion 48 defining a first opening 52 at an upper edge of the main body portion 48. FIG. 4 illustrates the cold-storage container 36 having an exemplary pivoting lid 50 to selectively provide access to a first chamber 54 of the interior of the cold-storage container 36 from a location in the cargo bed. Although not specifically shown, various other types of lids/covers/access panels may also be provided, including removable lids, sliding lids, and the like. The cold-storage container 36 includes a second opening 56 that provides access to a second chamber 58 of the interior.

The second chamber 58 may be defined by inner walls or dividing wall portions, including a top wall 60, a bottom wall 62, rear wall 65, and opposing side walls 64, 66. Certain of the walls 64, 65 may be exterior walls of the container itself. The various inner walls may be integrally formed in the cold-storage container 36, or may be provided as separate divider walls that can optionally be removable, and installed to provide different interior configurations. The second opening 56 is configured to provide access to an interior of the cold-storage container 36, such as the second chamber 58, from a location in the passenger cabin. In certain aspects, the inner walls of the second chamber can be provided with access panels, doors, or open areas (not shown) to permit passage between the first chamber 54 and the second chamber 58. In this regard, the second chamber 58 would then be accessible using either one of the first opening 52 and the second opening 56. While the second chamber is 58 shown located at a side region of the cold-storage container 36, the second chamber 58 may also be provided in different locations, such as in a center region of the cold-storage container 36. The location may depend on the size and the type of access panel(s) used.

Figure 5:
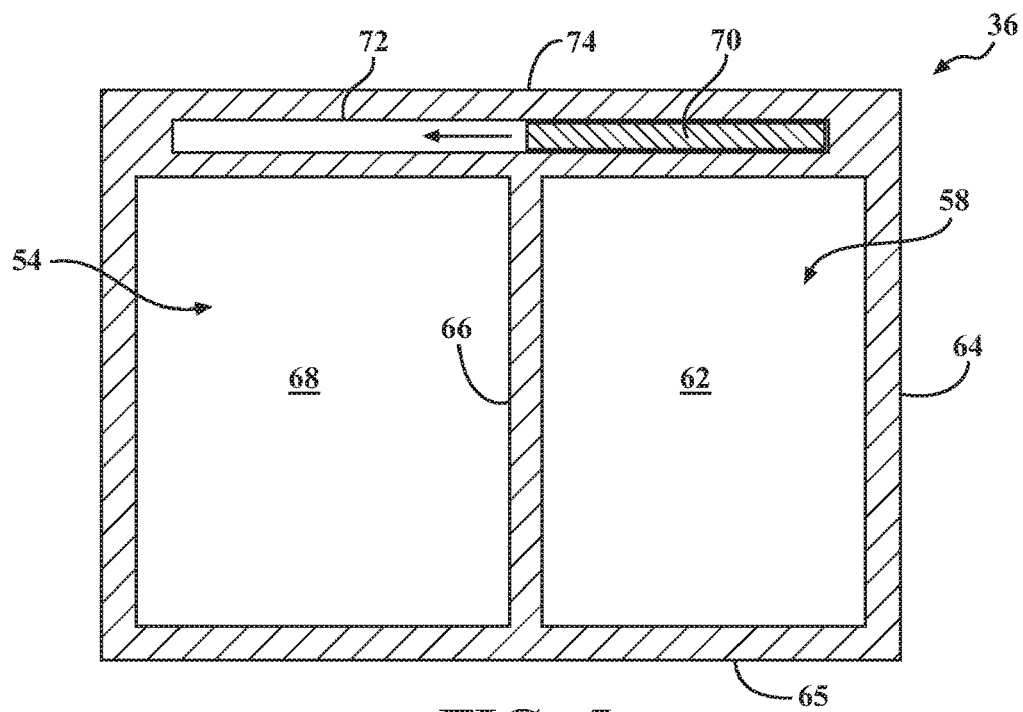
FIG. 5 is a cross-sectional view of the cold-storage container taken along the line 5-5 of FIG. 4 shown according to one aspect.
Figure 6:
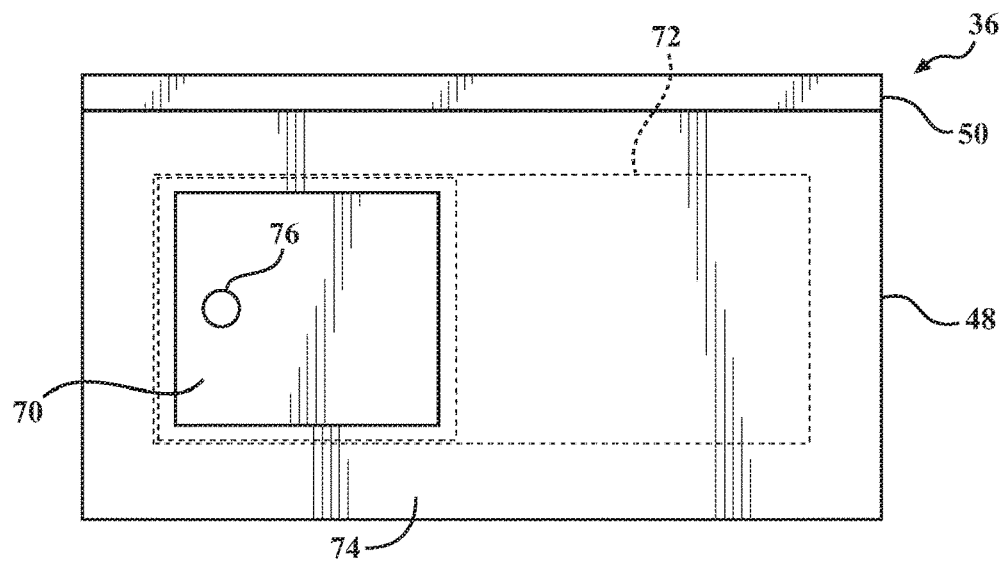
FIG. 6 is a plan view of a rear face of the cold-storage container shown in FIGS. 4 and 5 provided with a sliding access panel.

FIG. 5 is a side cross-sectional view of the cold-storage container taken along the line 5-5 of FIG. 4 shown according to one aspect, and further illustrates details of one exemplary design of the interior layout. Line 5-5 is intended to intersect with a center portion of the side wall 64. As shown, a sliding access panel 70 may be provided in a track 72 defined in a rear wall 74 of the cold-storage container 36. FIG. 6 is a plan view of the rear wall 74 of the cold-storage container 36 as shown in FIGS. 4 and 5, providing a more detailed view of the sliding access panel 70. A suitable handle 76 or knob may be provided for engaging a sliding movement of the access panel 70.

Figure 7:
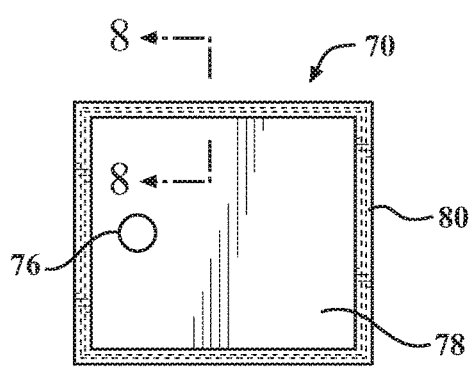
FIG. 7 illustrates further details of the sliding access panel according to one aspect.
Figure 8:
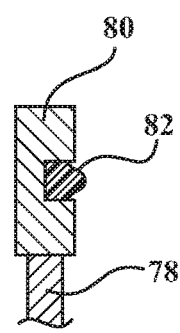
FIG. 8 is a magnified cross-sectional view of a frame portion of the access panel taken along the line 8-8 of FIG. 7 and illustrating a sealing member.

FIG. 7 illustrates further details of the sliding access panel 70 according to one aspect, having a panel body 78 optionally encased within an outer frame 80. The panel body 78 can be an insulating material, or may be provided as a transparent material, such as plastic or glass, permitting a user to view the interior of the second chamber 58 without the need to open the access panel 70. FIG. 8 is a magnified cross-section view of a portion of the outer frame 80 of the access panel 70 taken along the line 8-8 of FIG. 7 and illustrating an optional sealing member 82. While FIGS. 7-8 illustrate a separate panel body 78 and outer frame 80, in various aspects, the sliding access panel 70 can be a unitary component, with the frame integrated with the panel body.

Figure 9:
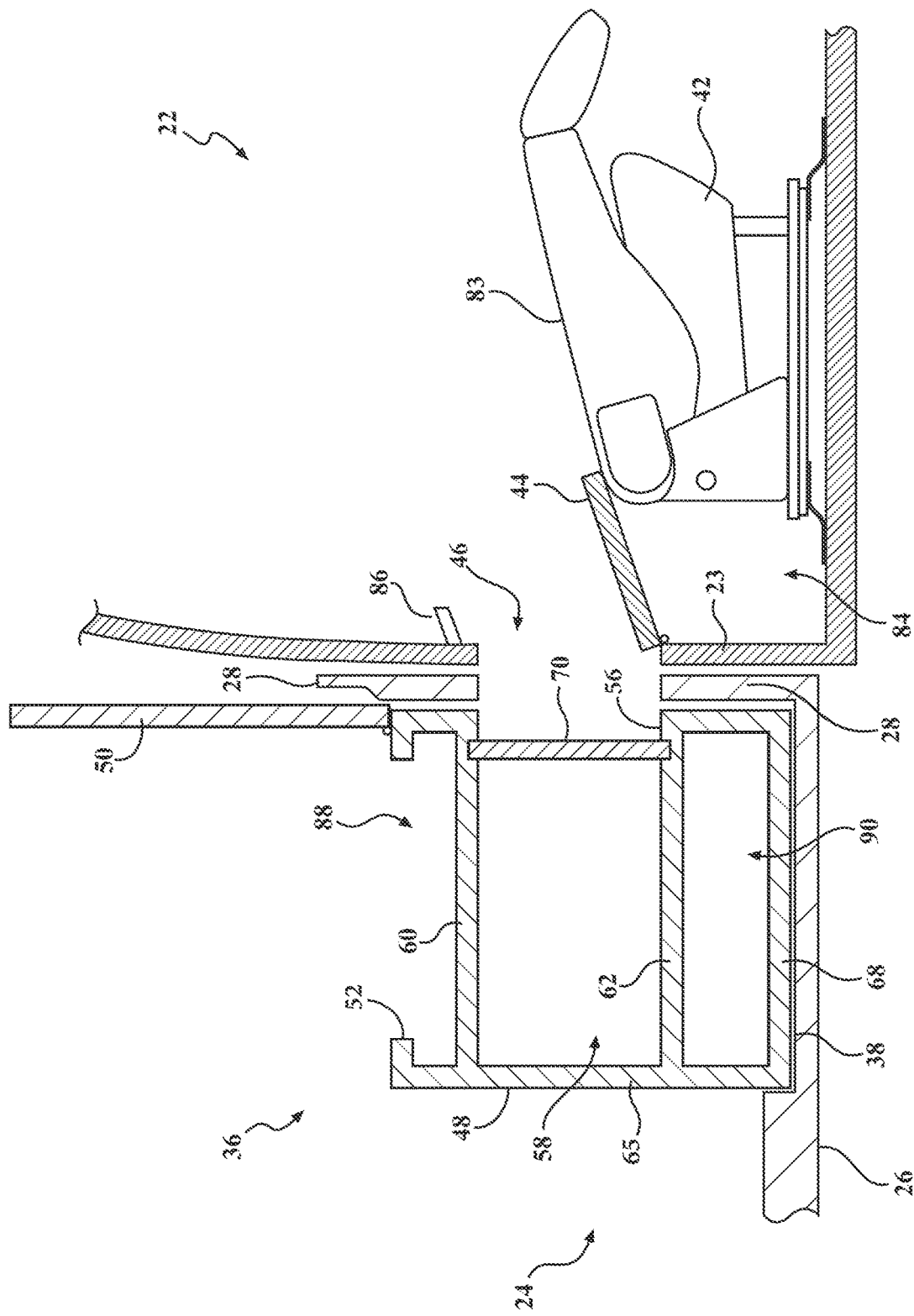
FIG. 9 is a partial cross-sectional view, similar to FIG. 3B, with the access door removed, the passenger seat in a folded position, an access panel located behind the passenger seat in an open position, and providing additional details of the cold-storage container.

FIG. 9 is a partial cross-sectional view of the cold-storage container vehicle assembly, similar to FIG. 3B, shown with the access door 40 removed, the passenger seat 42 in a folded position, and the access panel 44 located behind the passenger seat in an open position. In various aspects, a folding access panel 44 can be designed such that, when in an open position, it cooperates with a surface 83 of the passenger seat 42 to serve as a barrier, potentially preventing items from unintentionally being dropped into a gap 84 that may be located between the passenger seat 42 and a rear wall 23 of the passenger cabin 22, or otherwise unintentionally falling and being relocated to a floor area of the passenger cabin 22. A latch 86 or suitable locking mechanism may be provided to maintain the access panel 44 in a closed position.

FIG. 9 also provides various exemplary details of the cold-storage container 36. For example, the location of the second chamber 58 may be designed such that at least one of an upper open area 88 and a lower open area 90 is provided for a cooling material, such as ice or dry ice, to surround portions of the second chamber 58. For example, the lower open area 90 may be defined by the bottom wall 62 of the second chamber 58 and the bottom wall 68 of the cold-storage container 36 itself. In this regard, the interior of the second chamber 58 can provide cold, dry storage. As noted above, the chambers 54, 58 and/or walls may be shaped, molded, or otherwise provided with ribs, shelves, and other features to minimize movement of items placed in the cold-storage container 36.

In various aspects, the present technology may also be configured for use with a powered refrigeration unit to cool the interior of the cold-storage container 36. The refrigeration unit can be provided in addition to, or as a replacement for, traditional cooling materials such as ice, dry ice, and the like. The refrigeration unit can be integrated within the cold-storage container 36, or portions of the refrigeration unit can be located at other locations in the vehicle. Such a refrigeration unit may be powered by gas or electrical power as is known in the art.

Figure 10:
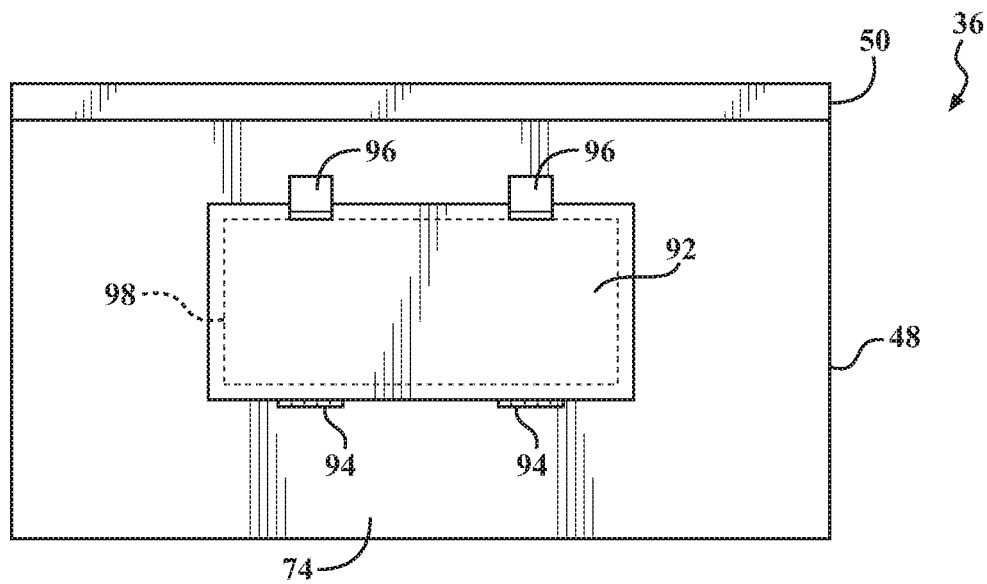
FIG. 10 is a plan view of the rear face of the cold-storage container shown with a folding access panel according to another aspect.
Figure 11:
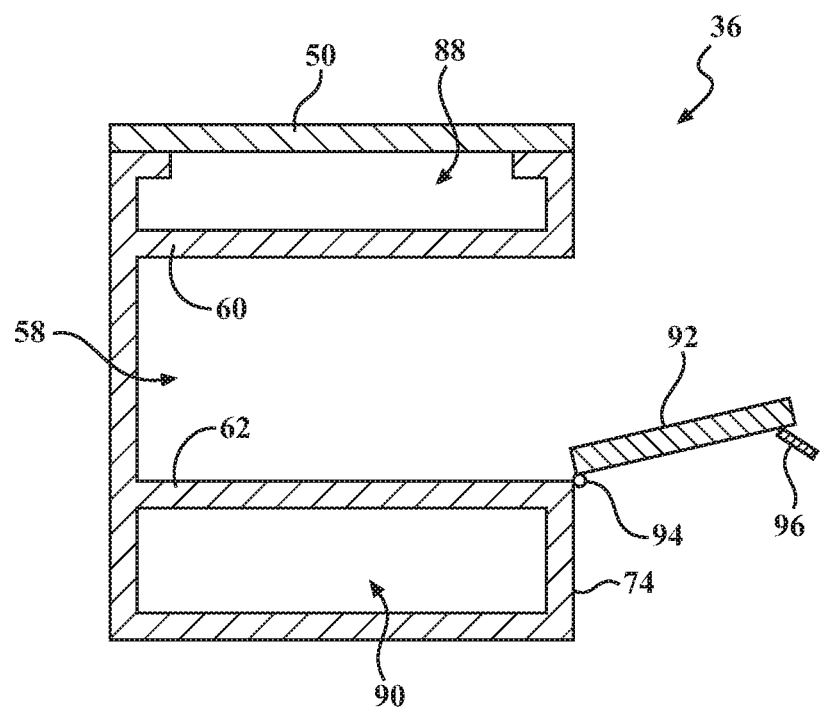
FIG. 11 is a cross-sectional view of the cold-storage container, similar to that shown in FIG. 9, with the folding access panel in an open position.

FIG. 10 is a rear plan view of the cold-storage container 36 shown with a folding access panel 92 generally in a center region of the rear facing wall 74 according to another aspect of the present technology. In the example shown, the folding access panel 92 may be provided with one or more hinge 94 and latch 96 to coordinate pivotal movement. An optional interior seal 98 may also be provided between the access panel 92 and the rear facing wall 74. FIG. 11 is a cross-sectional view of an exemplary design of a cold-storage container 36 with a folding access panel as detailed in FIG. 10, which is generally similar to that shown in FIG. 9, but with the folding access panel 92 in an open position.

Figure 12:
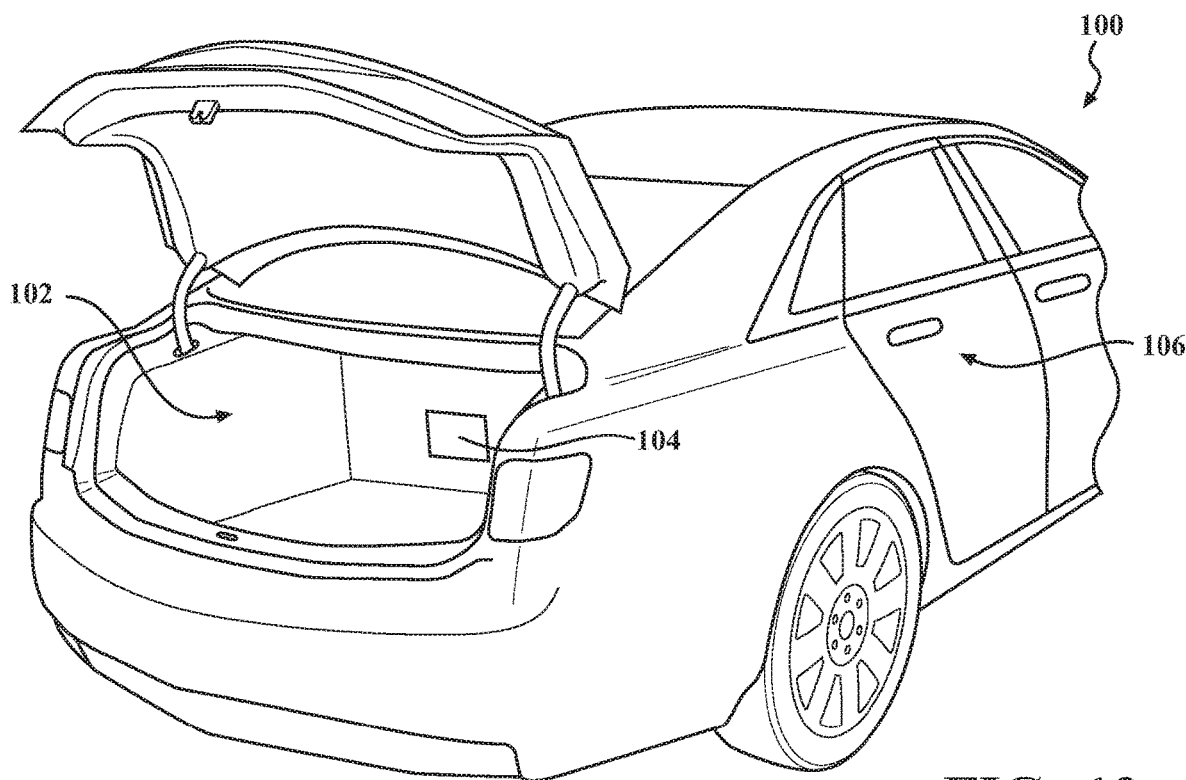
FIG. 12 is a partial perspective view of a trunk cargo area of a vehicle having an access door to the passenger compartment according to another aspect of the present technology.
Figure 13:
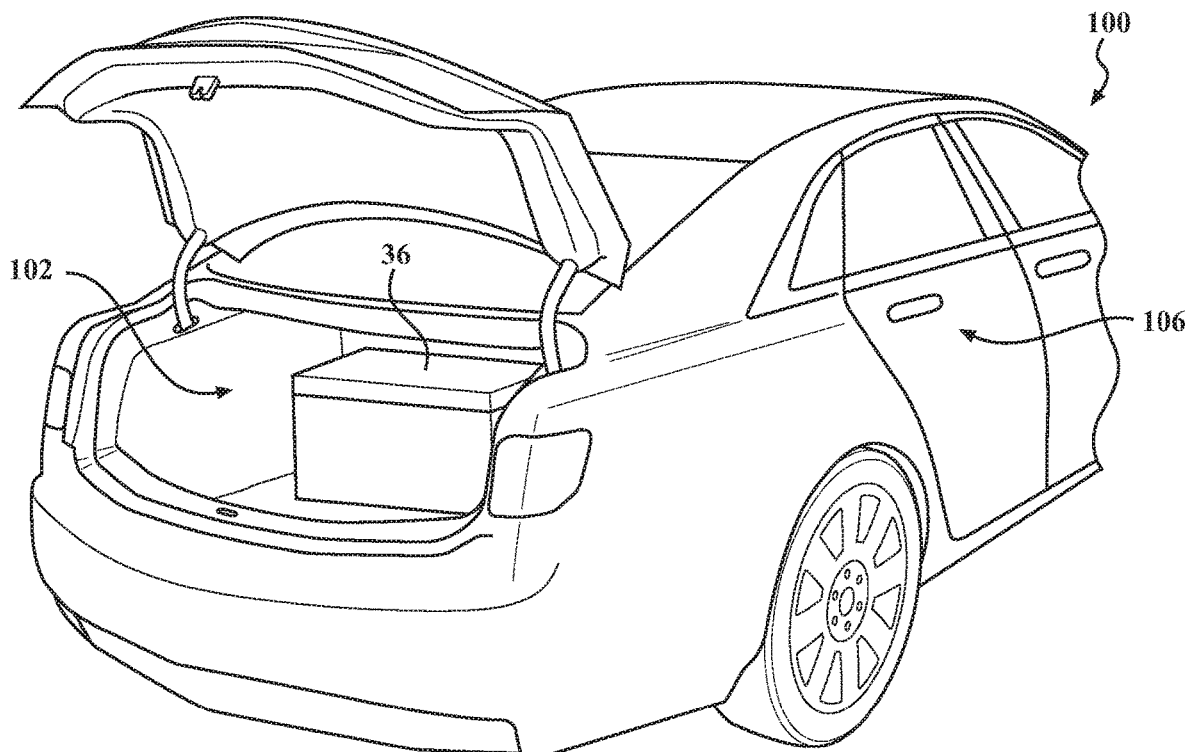
FIG. 13 is a partial perspective view of a cold-storage container disposed within the trunk cargo area of FIG. 12.

FIG. 12 is a partial rear perspective view of a more traditional passenger type vehicle 100 having a cargo area 102, for example, located in a trunk of the vehicle 100. Similar to the pickup truck design discussed above, an access panel 104 may be provided that enables selective entry into the passenger compartment 106. FIG. 13 is a partial rear perspective view illustrating the placement of a cold-storage container 36 disposed within the trunk/cargo area 102 of FIG. 12. The various details of the access panel 104 and design of the cold-storage container 36 may be similar to those discussed above.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A cold-storage container assembly for a pickup truck that provides multiple access points, the assembly comprising:
   a passenger cabin, the passenger cabin including a rear wall;
   a cargo bed adjacent the passenger cabin, the cargo bed including a header portion, a floor portion, and two opposing side-wall portions cooperating to defining a cargo space, the header portion being adjacent to the rear wall;
   a passageway between the cargo bed and an interior of the passenger cabin; and
   a cold-storage container disposed in the cargo bed, the cold-storage container including a first opening configured to provide access to an interior of the cold-storage container from a location in the cargo bed, and a second opening configured to provide access to the interior of the cold-storage container from a location in the passenger cabin, the passageway being elevationally aligned with the cold storage container, whereby a plane parallel to the ground passes through both the passageway and the cold storage container,
   the floor portion of the cargo bed including a recess area configured to receive a portion of the cold-storage container, the recess area being shaped to retain the cold-storage container in a fixed location within the cargo bed.

2. The assembly according to claim 1, wherein the header portion of the cargo bed comprises an access door configured to selectively provide the passageway between the cargo bed and the interior of the passenger cabin.

3. The assembly according to claim 2, wherein the passenger cabin comprises one of a sliding access panel and a folding access panel that selectively provides entry to the passageway and into the cold-storage container, and wherein the one of a sliding access panel and a folding access panel is provided at the rear wall of the passenger cabin.

4. The assembly according to claim 3, wherein the passenger cabin comprises the folding access panel, and wherein the folding access panel is located behind a folding passenger seat.

5. The assembly according to claim 4, wherein the folding access panel, when in an open position, cooperates with the folding passenger seat to serve as a barrier to prevent items from unintentional relocation to a floor area via a gap located between the folding passenger seat and the rear wall of the passenger cabin.

6. The assembly according to claim 3, further comprising a locking mechanism configured to maintain the one of the sliding access panel and a folding access panel in a closed position.

7. The assembly according to claim 2, wherein the access door is removably secured to the header portion of the cargo bed.

8. The assembly according to claim 1, wherein the interior of the cold-storage container defines:
   a first chamber accessible using the first opening and configured to store a cooling material; and
   a second chamber accessible using the second opening and configured to store items for cooling.

9. The assembly according to claim 8, wherein the second chamber is accessible using either one of the first opening and the second opening.

10. The assembly according to claim 8, wherein the second chamber is located within the first chamber to define open spaces that allow for a placement of the cooling material both above and below the second chamber.

11. The assembly according to claim 1, wherein the second opening of the cold-storage container comprises a sliding access panel that selectively provides access to the interior of the cold-storage container from the passenger cabin.

12. The assembly according to claim 1, wherein the cold-storage container is removably secured to at least one of the header portion and the floor portion of the cargo bed.

13. The assembly according to claim 1, further comprising a refrigeration unit configured to cool the interior of the cold-storage container.

14. A vehicle assembly that provides multiple access points to a cold-storage container, the vehicle assembly comprising:
   a vehicle having a passenger cabin and a cargo area adjacent the passenger cabin, the passenger cabin comprises one of a sliding access panel and a folding access panel that selectively provides access to a passageway and into the cold-storage container, the one of a sliding access panel and a folding access panel being a separate structure from a vehicle seat, whereby the one of a sliding access panel and a folding access does not move with the vehicle seat; and
   the cold-storage container disposed in the cargo area, the cold-storage container including a first opening configured to provide access from the cargo area to an interior of the cold-storage container, and a second opening configured to provide access from the passenger cabin to the interior of the cold-storage container,
   the cargo area including a floor portion, the floor portion including a recess area configured to receive a portion of the cold-storage container, the recess area being shaped to retain the cold-storage container in a fixed location within the cargo area.

15. The vehicle assembly according to claim 14, wherein the passenger cabin comprises the folding access panel, wherein the folding access panel is located behind the vehicle seat, and wherein the vehicle seat is a folding passenger seat.

16. The vehicle assembly according to claim 14, wherein the interior of the cold-storage container defines:
- a first chamber accessible using the first opening and configured to store a cooling material; and
- a second chamber accessible using the second opening and configured to store items for cooling.

17. The vehicle assembly according to claim 14, wherein the second opening of the cold-storage container comprises the sliding access panel that selectively provides access to the interior of the cold-storage container from the passenger cabin.

18. The vehicle assembly according to claim 14, further comprising a refrigeration unit configured to cool the interior of the cold-storage container.

* * * * *